US008081073B2

(12) United States Patent
Reibel et al.

(10) Patent No.: US 8,081,073 B2
(45) **Date of Patent: *Dec. 20, 2011**

(54) INTEGRATED MOTION-IMAGE MONITORING DEVICE WITH SOLAR CAPACITY

(75) Inventors: Jean-Michel Reibel, Lampertheim (FR); Keith Jentoft, Circle Pines, MN (US)

(73) Assignee: RSI Video Technologies, Inc., White Bear Lake, MN (US)

( * ) Notice: Subject to any disclaimer, the term of this patent is extended or adjusted under 35 U.S.C. 154(b) by 334 days.

This patent is subject to a terminal disclaimer.

(21) Appl. No.: 12/328,856

(22) Filed: Dec. 5, 2008

(65) Prior Publication Data

US 2009/0179988 A1 Jul. 16, 2009

Related U.S. Application Data

(63) Continuation-in-part of application No. 11/687,991, filed on Mar. 19, 2007, now Pat. No. 7,463,146, said application No. 12/328,856 is a continuation-in-part of application No. 11/388,764, filed on Mar. 24, 2006, now Pat. No. 7,463,145.

(60) Provisional application No. 60/785,570, filed on Mar. 24, 2006, provisional application No. 60/719,369, filed on Sep. 22, 2005.

(51) Int. Cl.

| | |
|---|---|
| ***G08B 13/00*** | (2006.01) |
| ***G08B 19/00*** | (2006.01) |
| ***H04N 7/18*** | (2006.01) |

(52) U.S. Cl. ........ 340/541; 340/517; 340/521; 340/522; 340/565; 340/693.1; 340/539.25; 340/539.17; 348/152; 348/154; 348/155; 382/103

(58) Field of Classification Search .................. 340/541, 340/517, 521, 522, 565, 539.25, 693.1; 348/152, 348/154, 155

See application file for complete search history.

(56) References Cited

U.S. PATENT DOCUMENTS 4,857,912 A 8/1989 Everett, Jr. et al.

(Continued)

FOREIGN PATENT DOCUMENTS

DE 101 50 745 A 1 4/2003

(Continued)

OTHER PUBLICATIONS

Csibi, S. et al. "Random Time and Frequency Hopping for Unslotted Asynchronous Access." IEEE 1996, p. 1123-1127.

*Primary Examiner* — Donnie Crosland

(74) *Attorney, Agent, or Firm* — Crawford Maunu PLLC

(57) ABSTRACT

Security systems and methods are implemented using a variety of devices and methods. According to one such implementation, a security system uses a controller to communicate with security-monitoring devices and has an integrated image-capture device with a circuit board structure with an angle-setting support article, a circuit board with a nonadjustable surface, and data-communicating conductors. A camera is secured to the nonadjustable surface and is directed at a first angle relative to the nonadjustable surface. A motion detector is secured to the nonadjustable surface and is directed at a second angle relative to the nonadjustable surface of the circuit board. The support article sets the first angle relative to the second angle for capturing both images and motion in a target area. A data-communication circuit communicates data from the camera and the motion detector and wirelessly communicates the data to the controller. A solar circuit provides power to the device.

19 Claims, 7 Drawing Sheets

U.S. PATENT DOCUMENTS 5,448,290 A 9/1995 Van Zeeland
5,473,368 A 12/1995 Hart
5,703,368 A 12/1997 Tomooka et al.
5,819,124 A 10/1998 Somner et al.
6,271,752 B1 8/2001 Vaios
6,411,209 B1 6/2002 Lyons et al.
6,476,858 B1 11/2002 Ramirez Diaz et al.
6,504,479 B1 1/2003 Lemons et al.
6,636,738 B1 10/2003 Hayashi
6,690,414 B2 2/2004 Lyons et al.
6,700,487 B2 3/2004 Lyons et al.
6,759,957 B2 7/2004 Murakami et al.
6,970,183 B1 11/2005 Monroe
7,151,945 B2 12/2006 Myles et al.
7,463,145 B2 * 12/2008 Jentoft .......................... 340/541
7,463,146 B2 * 12/2008 Reibel et al. .................. 340/541
2002/0171557 A1 11/2002 Wegener
2003/0065407 A1 4/2003 Johnson et al.
2003/0128130 A1 * 7/2003 Kao ........................... 340/693.1
2003/0193563 A1 10/2003 Suzuki
2003/0202117 A1 10/2003 Garner
2004/0046661 A1 3/2004 Vaccaro et al.
2004/0109059 A1 6/2004 Kawakita
2004/0155781 A1 8/2004 DeOme
2004/0190467 A1 9/2004 Liu et al.
2004/0205823 A1 10/2004 Tsai
2004/0205824 A1 10/2004 Tsai
2004/0239497 A1 12/2004 Schwartzman et al.
2005/0024206 A1 2/2005 Samarasekera et al.
2005/0134450 A1 6/2005 Kovach
2005/0134454 A1 6/2005 Eskildsen

FOREIGN PATENT DOCUMENTS

EP 676 733 A 10/1995
EP 811 959 A 12/1997
EP 0 856 826 A2 8/1998
EP 1 115 264 A2 7/2001
EP 1 363 260 A1 11/2003
EP 1 499 098 A1 1/2005
EP 1 316 933 B1 8/2006
GB 2 325 548 A 11/1998
GB 2 358 504 A 7/2001
JP 01236397 A 9/1989
JP 11154292 6/1999
JP 2003233889 8/2003
JP 2005071064 3/2005
WO WO 88/07474 1/1988
WO WO 00/03367 1/2000
WO WO 01/27763 A1 4/2001
WO WO 02/46919 A2 6/2002
WO WO 2004/064355 A2 7/2004
WO WO 2004/079684 A1 9/2004
WO WO 2004/114648 A2 12/2004
WO WO 2005/065196 A2 7/2005

* cited by examiner

INTEGRATED MOTION-IMAGE MONITORING DEVICE WITH SOLAR CAPACITY

RELATED PATENT DOCUMENTS

This patent document is a continuation-in-part under 35 U.S.C. §120 of U.S. patent application Ser. No. 11/687,991 filed on Mar. 19, 2007 (U.S. Pat. No. 7,463,146), and entitled "Integrated Motion-Image Monitoring Method and Device;" which claims benefit under 35 U.S.C. §119(e) to U.S. Provisional Patent Application No. 60/785,570 filed on Mar. 24, 2006 and entitled "Motion-Image Monitoring Method and Device;" this patent document is further a continuation-in-part of U.S. patent application Ser. No. 11/388,764 filed on Mar. 24, 2006 (U.S. Pat. No. 7,463,145), and entitled "Security Monitoring Arrangement And Method Using A Common Field Of View;" which in turn claims benefit under 35 U.S.C. §119(e) to U.S. Provisional Patent Application No. 60/719,369 filed on Sep. 22, 2005 and entitled "Security Monitoring Arrangement and Method with Privacy Control." Priority is claimed for common subject matter to each of these underlying patent documents.

FIELD OF THE INVENTION

The present invention is directed to a method and device for monitoring the inside of a facility or residence and, more specifically, to a method and device using an integrated motion detector and camera designed for extended-unpowered and/or outdoor use.

BACKGROUND

A variety of applications benefit from protection of residents, employees, personal property, and the like, by using security monitoring systems within facilities, e.g., to monitor and/or sense certain conditions such as a facility-operations problem or the presence of an unwanted intruder. Many such security systems are connected to a central control unit and monitored by an operator who can alert the appropriate emergency services in the event of an unwanted intruder. Often, a home monitoring security system includes a combination of sensing devices and alarm devices and some also include cameras. To achieve the maximum monitoring coverage, these devices are distributed throughout the interior of the facility.

Security systems that employ cameras are advantageous in that they are able to record any and all activity associated with a suspected breach of the facility. In some instances, however, the cameras record the regular activities of the facilities' residents and/or employees. The cameras also record activities that are falsely perceived to be security breaches such as pet behaviors and authorized users that have been accidentally locked out.

In specific situations, such as those having the potential to violate the privacy of authorized residents and/or employees of the facility, such comprehensive recordation by the security cameras may be undesirable. Since unwanted intruders could breach the security of a facility while the inhabitants are present, it is necessary for the security monitoring system to be functioning at all times. However, having cameras constantly being triggered to record inhabitants' daily living and working routines is a dramatic invasion of the inhabitants' privacy, especially considering false triggers. Further, the monitoring and recording of guests' activities can be just as invasive.

While numerous cameras and motion detectors are generally necessary to provide proper security coverage of a residence or facility, the size and frequent placement of the devices are burdensome to install and maintain and are aesthetically unpleasant. Each room or area in a facility typically requires both a motion detector and a camera, and large areas may require more combinations. The sizes of these devices render their presence in a facility obvious. Moreover a full-facility security system typically requires installation of several system components including wiring for communications and power between cooperative units within the system.

Implementing small detectors and cameras presents a host of problems. For security reasons, ease of installation and flexibility of a system, it is a disadvantage to require the detectors and cameras to be electrically connected to other components. More specifically, detectors and cameras that operate using an external power source, such as an electrical outlet, can be circumvented by removing the power source. This presents a number of security weaknesses in the overall system. Moreover, reliance on an external power source often complicates the installation process because the installation requires a connection to the external power source. This may require routing of wires carrying power to the detectors and cameras. Small devices have the additional problem of not having space to include large independent power sources, such as batteries. Accordingly, the functionality and time between charging of the devices is often sacrificed for size. For example, many wireless communications protocols drain batteries and other power sources rapidly. Other power hungry portions of cameras and detectors include the camera, the detector, image processing and illumination devices. These and other problems have hampered the implementation of small, portable cameras and detectors used in security applications.

The above-discussed issues have presented challenges to developing a home and/or facility security monitoring system that provides maximum coverage while minimizing one or more of the above-identified issues.

SUMMARY

The present invention is directed to the above and related types of integrated security devices. These and other aspects of the present invention are exemplified in a number of illustrated implementations and applications, some of which are shown in the figures and characterized in the claims section that follows.

Various aspects of the present invention are applicable to a security device that uses both motion detection and image-capture to detect a security breach.

According to one embodiment of the present invention, a security system uses a controller to communicate with security-monitoring devices and has an integrated image-capture device comprising a circuit board structure having an angle-setting support article, a circuit board with a nonadjustable surface, and data-communicating electrical conductors. A camera is secured to the nonadjustable surface and is directed at a first angle relative to the nonadjustable surface. A motion detector is secured to the nonadjustable surface and is directed at a second angle relative to the nonadjustable surface of the circuit board. The support article sets the first angle relative to the second angle for capturing both images and motion in a target area. A data-communication circuit communicates data from the camera and the motion detector via the data-communicating electrical conductors and wirelessly communicates the data to the controller. A rechargeable power supply provides power to a monitoring device. A solar circuit converts optical energy into electrical energy. A charge circuit receives electrical energy from the solar circuit and uses the received electrical energy to charge the rechargeable power supply.

Consistent with another embodiment of the present invention, a security system uses a controller to communicate with security-monitoring devices. An integrated image-capture device has a circuit board structure with an angle-setting support article, a circuit board with a nonadjustable surface and electrical conductors. An integrated arrangement includes a camera secured to the nonadjustable surface and directed at a first angle relative to the nonadjustable surface. The arrangement also includes a motion detector secured to the nonadjustable surface and differently directed at a second angle relative to the nonadjustable surface of the circuit board. The support article sets the first angle relative to the second angle for capturing both images and motion in a target area. The camera and the motion detector are electrically connected to respective ones of the electrical conductors. A control circuit provides wireless communication between the controller and the integrated arrangement.

According to another embodiment of the present invention, a security system uses a controller to communicate with security-monitoring devices. Within the security system an integrated image-capture device is used that has a battery circuit. The battery circuit is connected to a circuit for receiving wireless control signals. The receiving circuit is connected to a power-control circuit that is responsive to reception of the wireless control signals and that controls use of the battery circuit. The device also includes a camera, a motion detector and a circuit board structure to electrically integrate the camera and the motion detector. The circuit board structure sets a first angle at which the camera is to capture images and a second angle, different from the first angle, at which the motion detector is to detect motion. Logic synchronizes transmission of data between the circuit for receiving wireless control signals and the controller.

According to another embodiment of the present invention, a security system uses a controller to communicate with security-monitoring devices. An image-capture device having a circuit board with a nonadjustable surface includes a circuit for wirelessly interfacing with the controller. The image-capture device has a camera secured to the nonadjustable surface of the circuit board and directed at a first angle substantially perpendicular to the surface of the circuit board. A motion detector integrates with the nonadjustable surface of the circuit board using one or more through-hole connections. A support directs the motion detector at a second angle different from said first angle during soldering of the through-hole connections. The motion detector further includes a solar circuit for generating power to charge a local power supply, such as a battery.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1A:
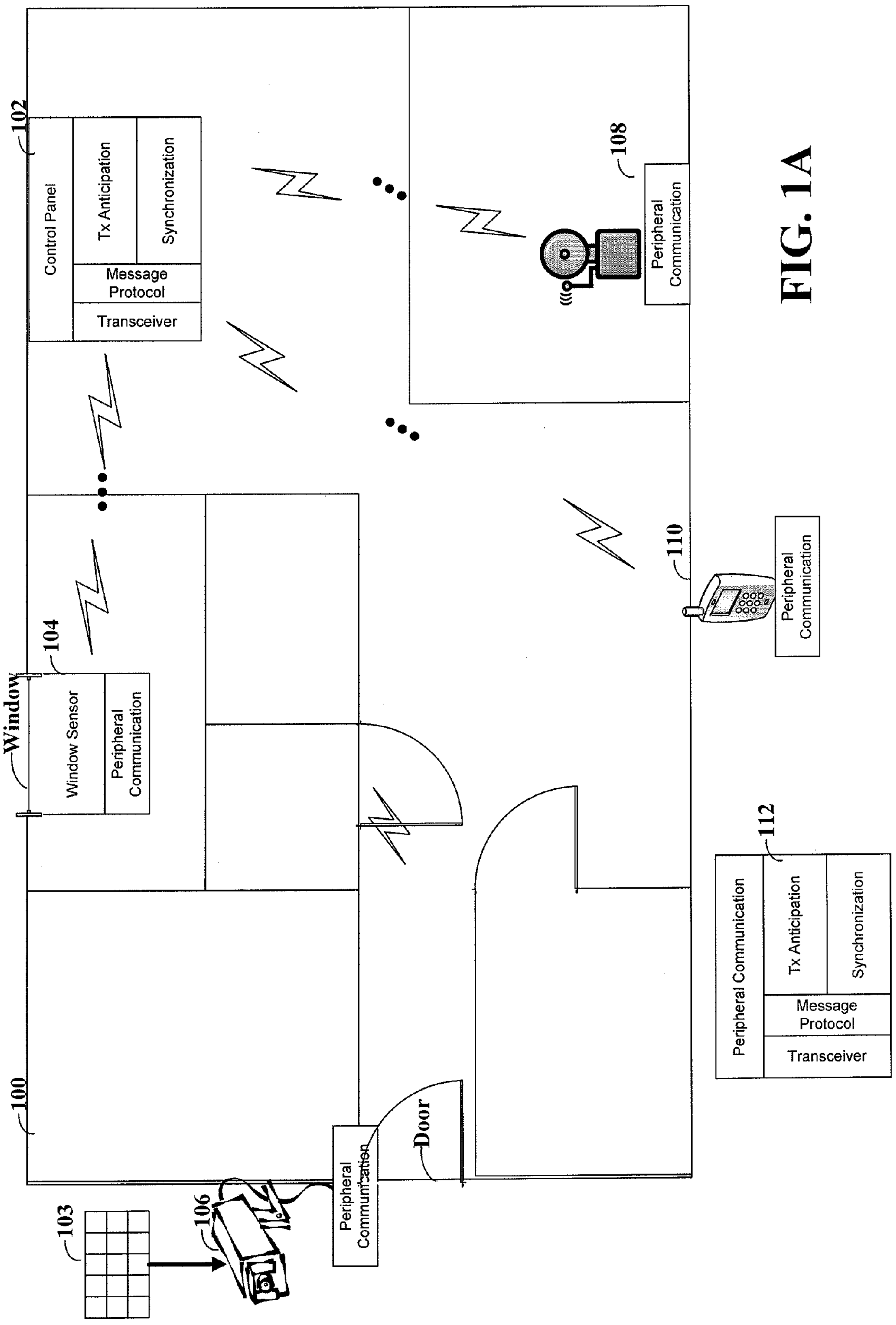
FIG. 1A shows a building-security system, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different approaches for, and arrangements used in, monitoring a target area. The invention has been found to be particularly advantageous for addressing security-monitoring applications in a residence or office-facility environment where one or more peripheral devices communicate with another device and are used to monitor one or more respective target areas. While the present invention is not necessarily so limited, such a security-monitoring application is used in the following discussion to exemplify certain embodiments of the present invention.

According to one embodiment of the present invention, one or more of the monitoring devices are configured for outdoor usage. These devices can include one or more features designed to facilitate outdoor usage. One such feature is a solar-panel arranged to provide power to the device. The solar power can supplement power from a local power source (e.g., a battery) and/or provide power for storage (e.g., by charging a battery). In combination with various power-saving aspects, discussed hereafter, a solar power source can be particularly useful. For instance, in some implementations the solar power source may be sufficient to meet all the power demands of the device. Even where the solar power source is not sufficient to meet all the power demands of the device, the battery life of the device can still be significantly increased.

Another feature relates to mechanisms that compensate for light variances experienced in outdoor implementations. According to one embodiment, an overhang or light filter can be used to block direct sunlight from interfering with the image capture. An overhang can be designed to stop direct sunlight at a certain angle. The angle can be computed, for example, by determining the possible angles of sunlight for a given (or all) location on the Earth. Such an overhand can also be useful for blocking precipitation. Other weather-proofing can be implemented including, but not limited to, fog resistant transparent openings and water-/snow-shedding coatings or materials. According to one embodiment, a camera test can be performed to test for problematic conditions, such as snow or ice buildup. A captured image can be assessed to determine if a suitable image can be captured. If not, the device can provide a fault indication, which can be used to alert a user of the system to the issue. The camera test can be implemented periodically, or can be triggered by the system. For example, the system could implement a test in response to weather reports or weather sensors.

According to another embodiment, the camera aperture and/or exposure time can be adjusted according to current light conditions.

The use of infrared lighting can be useful for lessening disturbance on neighbors and others while still allowing for the capture of quality images in low-light conditions.

Consistent with such an application, FIG. 1A depicts a security system according to an example embodiment of the present invention, as might be useful for monitoring a building (such as a home or workplace). FIG. 1A includes building 100, control panel 102, and peripheral devices 104-110. The security system is implemented in such a manner so as to reduce the power consumption of one or more of the control panel 102 and the peripheral devices 104-110 as related to the wireless communications between the devices. When implementing the wireless communications, the devices use multiple frequencies (channels) as well as communication intervals. The devices are able to reduce the power consumption by utilizing information regarding a specific frequency from the multiple frequencies used and the communication interval. For example, if the transmitting devices modify their transmissions based upon the information, a receiving device may reduce the power consumption by decreasing the time the receiving device is listening for a transmission from another device. By reducing the power consumption, the system lends itself to implementing bi-directional communications between the devices, which typically require more power consumption than unidirectional communications.

The jagged lines and ellipses found between the control panel 102 and the peripheral devices 104-110 represent wireless communications between the control panel and the peripheral devices. The wireless communications may be implemented using suitable frequencies. For instance, wireless communications frequencies in industrial, scientific and medical (ISM) radio bands (900 Mhz, 2.4 Ghz and 5.8 Ghz) have been found to be suitable for security systems; however, alternate frequencies may be implemented in accordance with the particulars of the system or its intended implementation. For example implementations related to communicative coupling and data transfer among the above-discussed devices in accordance with appropriate protocols, reference may be made to U.S. application Ser. No. 11/389,673 filed on Mar. 24, 2006, entitled "Spread Spectrum Communications for Building-Security," and to European Patent Application Publication No. EP 1 363 260 filed on May 6, 2003, entitled "Procédé De Communication Radiofréquence Entre Plusieurs Dispositifs Et Systèeme De Surveillance Mettant En Ouvre Un Tel Procédé," which are herein fully incorporated by reference.

The various elements of the peripheral devices 104-110 and the control panel 102 are implemented using one or more of electric circuit arrangements, processors, memory elements, software code, programmable logic devices, input/output interfaces or combinations thereof. In alternative (more specific) embodiments, the embodiments disclosed herein are implemented in combination with the embodiments described in the above-referenced patent document Ser. No. 11/388,764, entitled "Security Monitoring Arrangement And Method Using A Common Field Of View" (fully incorporated herein by reference).

Solar collector 103 converts solar energy into electrical energy. This converted energy can then be used to power peripheral device 106 and/or to charge a local power source, such as a lithium battery. In combination with a variety of other features, the power from the solar collector 103 can significantly increase the expected run-time of peripheral device 106.

Building 100 represents a facility for which the building security system is implemented. Common implementations of building 100 include, but are not limited to, residential homes, retail stores, office buildings, government buildings, museums and other facilities. Typically, the security system will monitor several locations of building 100. Accordingly, FIG. 1A depicts various peripheral devices throughout the building.

Peripheral communications devices 104-110 may take the form of various different devices, a few of which are depicted in FIG. 1A. For instance, device 104 depicts a window sensor that may, among other things, detect when the window has been opened or otherwise compromised; device 106 depicts a camera for video capture; device 108 depicts an alarm; and device 110 depicts a mobile peripheral, such as a key fob for interfacing with the control panel 102 or another peripheral. These peripheral devices 104-110 communicate with control panel 102 using wireless communications.

Block 112 depicts several elements that may be implemented in the peripheral devices 104-110, including a transceiver block, a message protocol block, a synchronization block and a transmit (Tx) anticipation block. Various embodiments of the present invention use one or more of these blocks. In one such embodiment, a peripheral device wirelessly transmits a signal using the transceiver block. The peripheral device uses information regarding a transmission period and the listening channel of the control panel in the transmission process.

In one embodiment, the peripheral devices 104-110 transmit building security information to the control panel 102. For instance, device 106 might transmit video images or device-status information to the control panel 102, while device 104 might transmit information relating to the window sensor.

FIG. 1A depicts control panel 102 as including a transceiver block, a message protocol block, a synchronization block and a transmit (Tx) anticipation block. Various embodiments of the present invention use one or more of these blocks. In one such embodiment, the transceiver block is used for receiving signals from one of the peripheral devices 104-110 as a function of the communication intervals and the frequency the control panel 102 uses to listen for transmissions. The listening frequency is one of several potential frequencies available for communication between the peripheral devices and the control panel. For instance, the system may use a number of contiguous frequency slots (channels) within a suitable frequency band. One example of such a use includes 25 or more channels within the ISM frequency band from 902-928 MHz. Numerous other combinations of channels and frequency bands are possible using the present invention.

Typically, the control panel and peripherals are implemented using a similar set of elements as depicted by blocks 102 and 112; however, various components may be implemented differently. For instance, the synchronization block can be implemented differently in the control panel versus the peripheral devices where the control panel provides synchronization information to each of the peripherals and the peripherals must use the synchronization information to maintain synchronization using a local clock. In such an instance, the peripherals would compare the synchronization information with the local clock in order to compensate for any difference between the peripherals' time frames and the control panel's time frame.

The control panel 102 and the peripheral blocks 104-110 are depicted as having a transceiver; however, the system may be implemented using variations of receivers and transmitters. In some instances, the control panel may be implemented with only a receiver and the peripherals with only a transmitter. In other instances, the control panel may be implemented with only a transmitter, while the peripherals are implemented with only a receiver. Other implementations allow for one or more of the control panels and peripherals to have both a transmitter and receiver (transceiver). Thus, transceiver is used herein to describe a receiver, transmitter or both a receiver and transmitter.

Figure 1B:
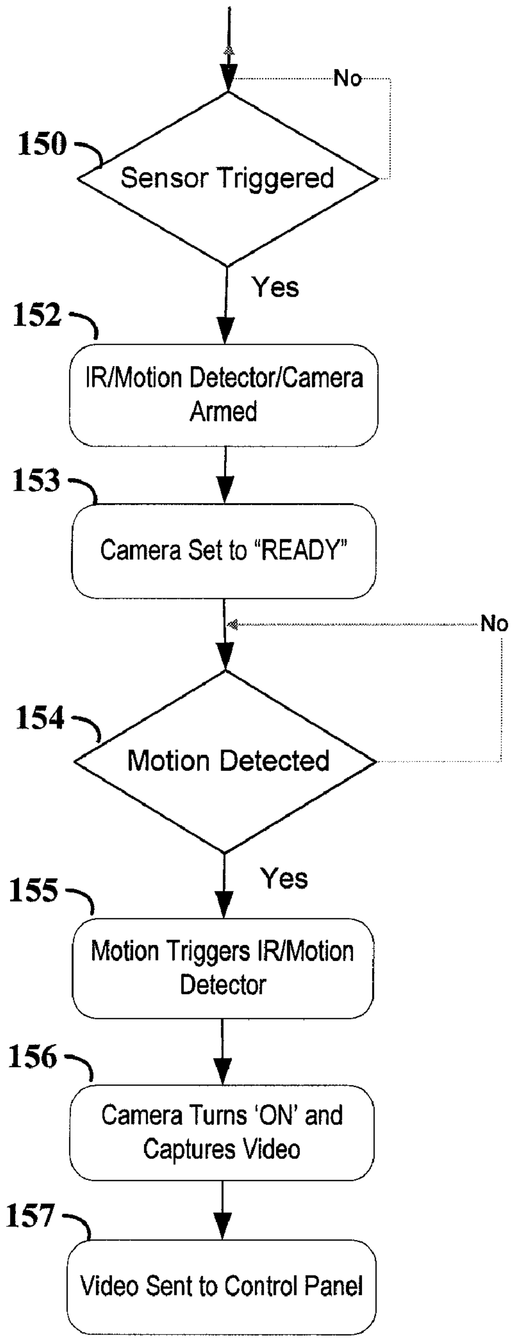
FIG. 1B shows a flow diagram of how an integrated security system detects an intruder, according to an example embodiment of the present invention.

FIG. 1B illustrates a process for detecting an intruder, according to an example embodiment of the present invention. The process shown in FIG. 1B may be implemented, for example, using a security system such as that shown in FIG. 1A or otherwise described herein. An intrusion sensor, such as a window or door contact, located at a perimeter of a facility detects whether the contact subject, window or door, has been breached 150. If, for example, a window has been opened, the window contact (intrusion sensor) sends a signal to a corresponding integrated motion sensor/camera located at the interior of the facility. Upon receipt of the intrusion signal, the motion sensor is activated 152 and the integrated camera is set to a "ready" mode without initiating recording 153. The motion detector remains activated 154 and when motion is detected, the integrated motion sensor/camera is again triggered 155. Once motion is detected, the camera turns "on" and captures images of the source of the motion 156. The video images are sent to a central control panel for further evaluation 157. Further evaluation may include determining (manually or automatically using, e.g., machine visions) whether the source of the motion is human, an animal such as a pet, or another moving object. If the source is determined to be human, further evaluation may reveal whether any identifying images were captured, whether the human is an intruder or an inhabitant of the facility, and face recognition may be used to identify a previously unknown person intruding on the facility.

In another embodiment, the motion detectors, while always powered, are also always in a state of motion sensing. Thus, if motion is detected shortly before an intrusion signal is transmitted, the control panel and/or base unit can recognize the chain of events as an authorized person within the monitored zone merely opening a window or door. This aspect is also advantageous as a "privacy" feature insofar as maintaining the image sensor in a disabled mode; images of the authorized person within the monitored zone would not be captured when the window is opened. The system is programmed to recognize alternate orders of signal transmission as corresponding to permitted behavior, thereby reducing the potential for the security system creating, and responding to, a false alarm.

In another example embodiment, the home entry intrusion sensor (e.g., front door contact) corresponds to a delayed-response motion sensor such that the transmission of the motion indication is delayed to accommodate a security system control keypad located near the entrance. In another zone located nearby, such as a kitchen, the motion indication is not delayed when motion is detected. The system recognizes that motion sensed in the nearby room (e.g., person setting grocery bags down in the kitchen) following a delayed sensing of motion in the entry zone is likely an authorized user and an alarm will not sound for a predetermined length of time. If the system is not deactivated or reset before the predetermined length of time expires, the alarm will sound. The number of nearby zones configured with such a relationship with the delayed motion indication in the entry zone should be limited to ensure that an actual intruder is not provided enough time to traverse the premises without being detected.

Figure 2:
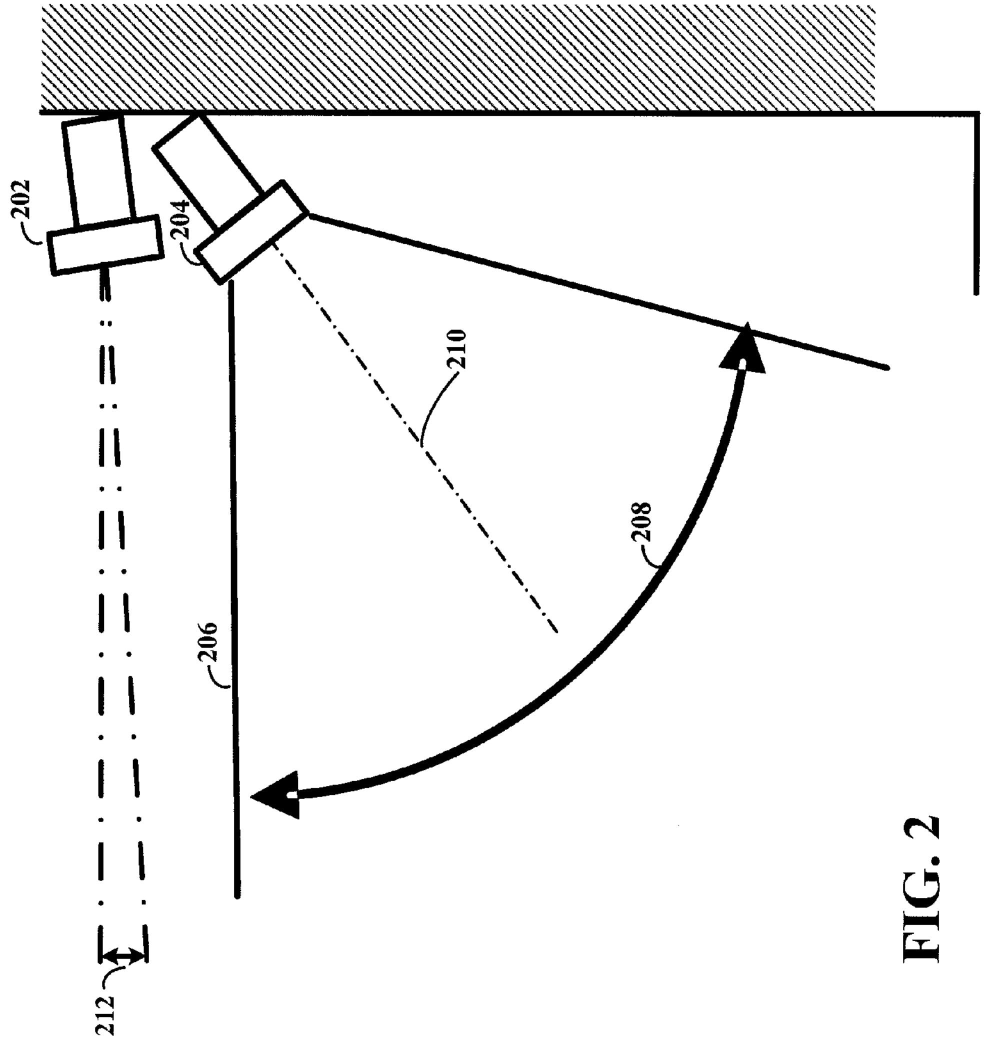
FIG. 2 illustrates a security device mounted to a wall, according to an example embodiment of the present invention.

FIG. 2 illustrates a security device mounted to a wall, according to an example embodiment of the present invention. An example embodiment of the present invention involves a monitoring device that includes an integrated motion detector and an image-capture device. In certain implementations, the motion detector is designed with a passive infrared (PIR) detector 202. While other motion detectors may be used, the remaining discussion of the motion detector will refer to a PIR-type detector. The security device points the PIR detector at an angle 212. In a preferred implementation, the PIR detector 202 is positioned at an angle 212 of about five degrees to a horizontal axis (e.g., parallel to the ground). The monitoring device also includes an image sensor 204. For certain implementations, the lens of the image sensor is a wide angle lens (e.g., a Fresnel lens). In one instance, the security device directs the image sensor 204 in a direction 210. The image sensor 204 may be oriented such that the upper bound 206 of the viewing area 208 is at or near horizontal, one example being parallel to the ground. While maintaining this common upper bound 206, the two components (i.e., the PIR detector 202 and the image sensor 204) can be angled at different angles so as to form a common field of view. This can be useful for increasing the effective coverage of the components. For example, the devices can be easily installed because the installer knows the coverage (shown by field of view 208) will extend horizontally from the height the components are placed on the wall. Thus, the installation height is easily established by determining the highest point for which coverage is desired (e.g., head level). Moreover, such an alignment between components can be beneficial because the components can have a common field of view. More specifically, an indication of motion by a PIR sensor will directly correspond to the image captured by a camera.

Figure 3:
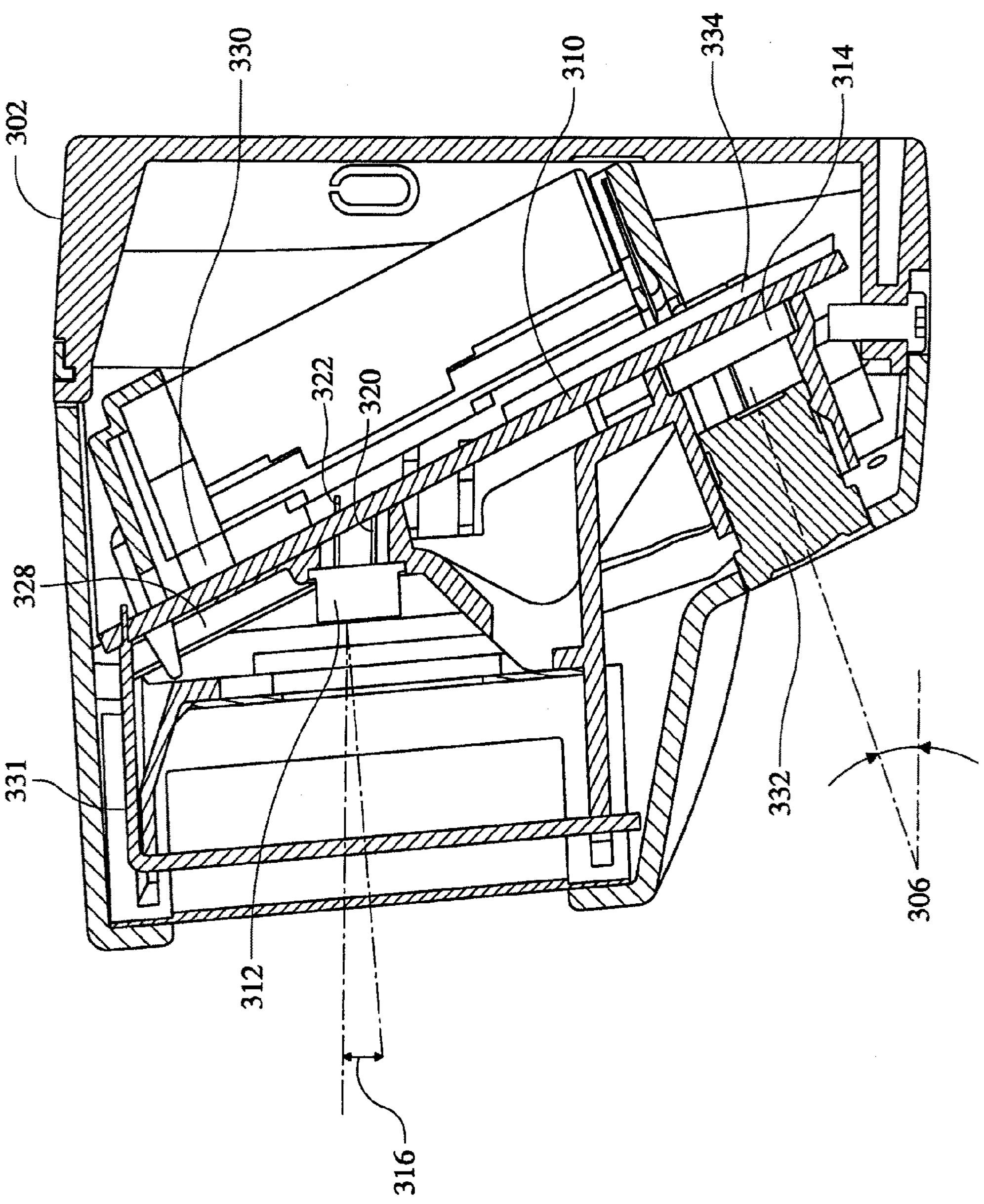
FIG. 3 is a side view of a motion-image security device, according to an example embodiment of the present invention.

FIG. 3 is a side view of a motion-image security device, according to an example embodiment of the present invention. In one implementation consistent with the example illustration shown in FIG. 3, the monitoring device includes a housing 302 that contains a single circuit board 310 for both components (motion sensor 312 and image-capture device 314). In a particular embodiment, circuit board 310 is one of a variety of commonly used solid printed-circuit-boards (PCB). For example, circuit board 310 may be implemented using a common 2 (or more) layer FR4 circuit board that has a rectangular shape as shown by FIG. 3. Many standard circuit components (e.g., image detectors and PIR devices) are designed to mount flush with a circuit board. Accordingly, standard circuit components mounted on a common circuit board results in the circuit components having a common alignment (e.g., perpendicular to the circuit board), as shown by angle 306. Certain aspects of the present invention provide for the use of such a solid circuit board and standard components having different alignments. For instance, an angled support 502 (shown in FIG. 5) is used in connection with the single circuit board 310 to provide the PIR sensor angle depicted at 316. Wired legs 320 and 322 of the sensor 312 pass through and are used with "through holes" to package the PIR sensor 312 with the circuit board 310. The angle difference between the wired legs 320 and 322 and circuit board 310 can be accommodated using any number of techniques. A few example techniques include, without limitation, bending the wired legs 320 and 322, using holes in circuit board 310 sufficiently large to allow for angled entrance of wired legs 320 and 322, using angled holes in circuit board 310 and fastening the wired legs to one side of the circuit board using solder, screws or similar fastening techniques. Either side of the circuit board 310 includes areas 328 and 330 for mounting circuitry such as PIR signal-manipulation circuitry and radio frequency (RF) transceiver circuits (discrete and/or integrated components) and the antenna 331. Similarly, the circuit board 310 includes areas for mounting an image-capture related-device (e.g. lens) 332 and a video processor 334 programmed to process (manipulate) captured images.

In a more particular application, the RF and related circuits mounted on the board can be designed and programmed to implement the communication and related operations in a manner consistent with one or more embodiments disclosed in the above-referenced U.S. patent document, filed on Mar. 24, 2006, and entitled "Spread Spectrum Communications for Building-Security" Ser. No. 11/389,673.

Figure 4A:
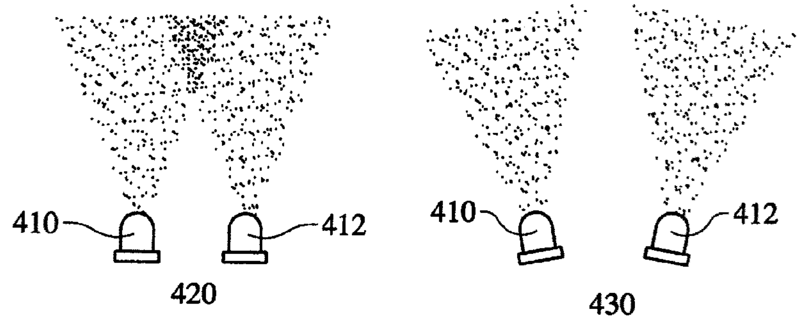
FIG. 4A illustrates orientations of LEDs, according to an example embodiment of the present invention.
Figure 4B:
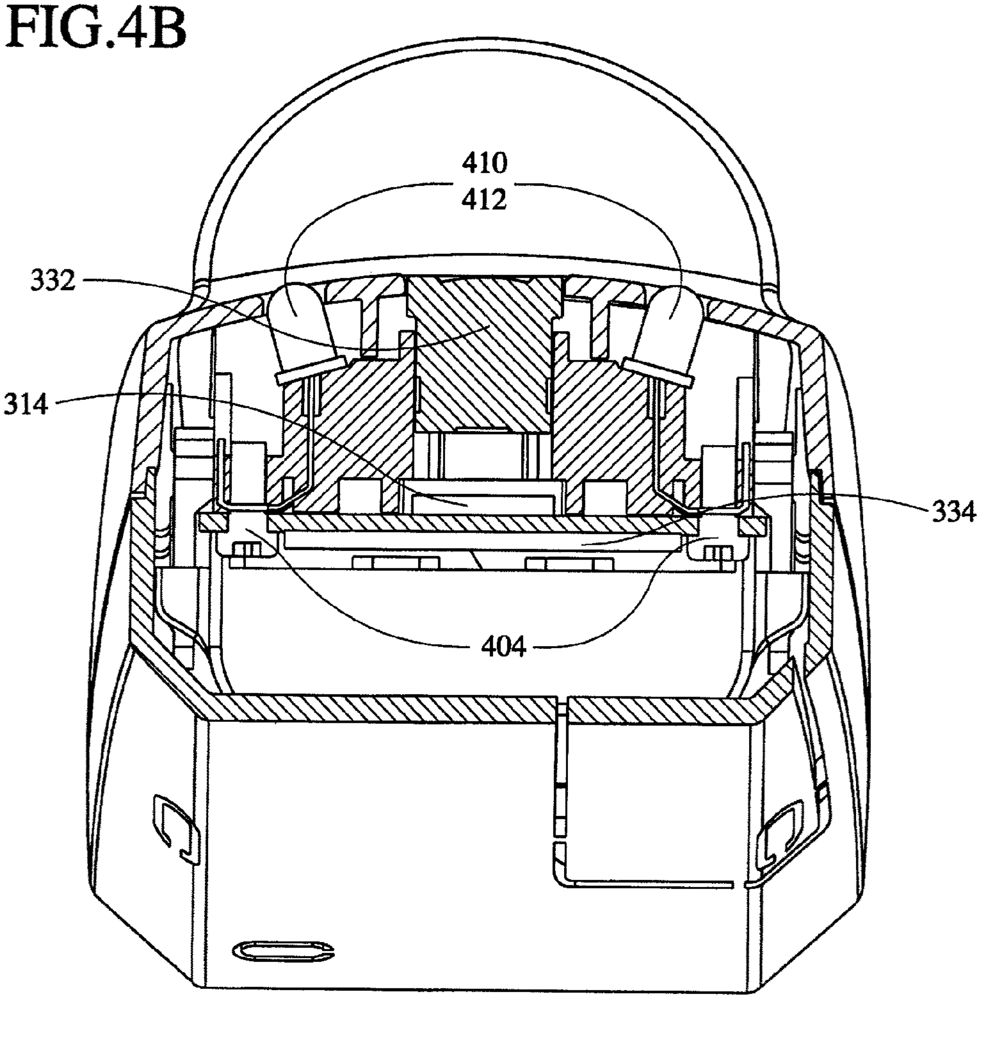
FIG. 4B is a bottom view of a motion-image security device showing LED orientation, according to an example embodiment of the present invention.
Figure 5:
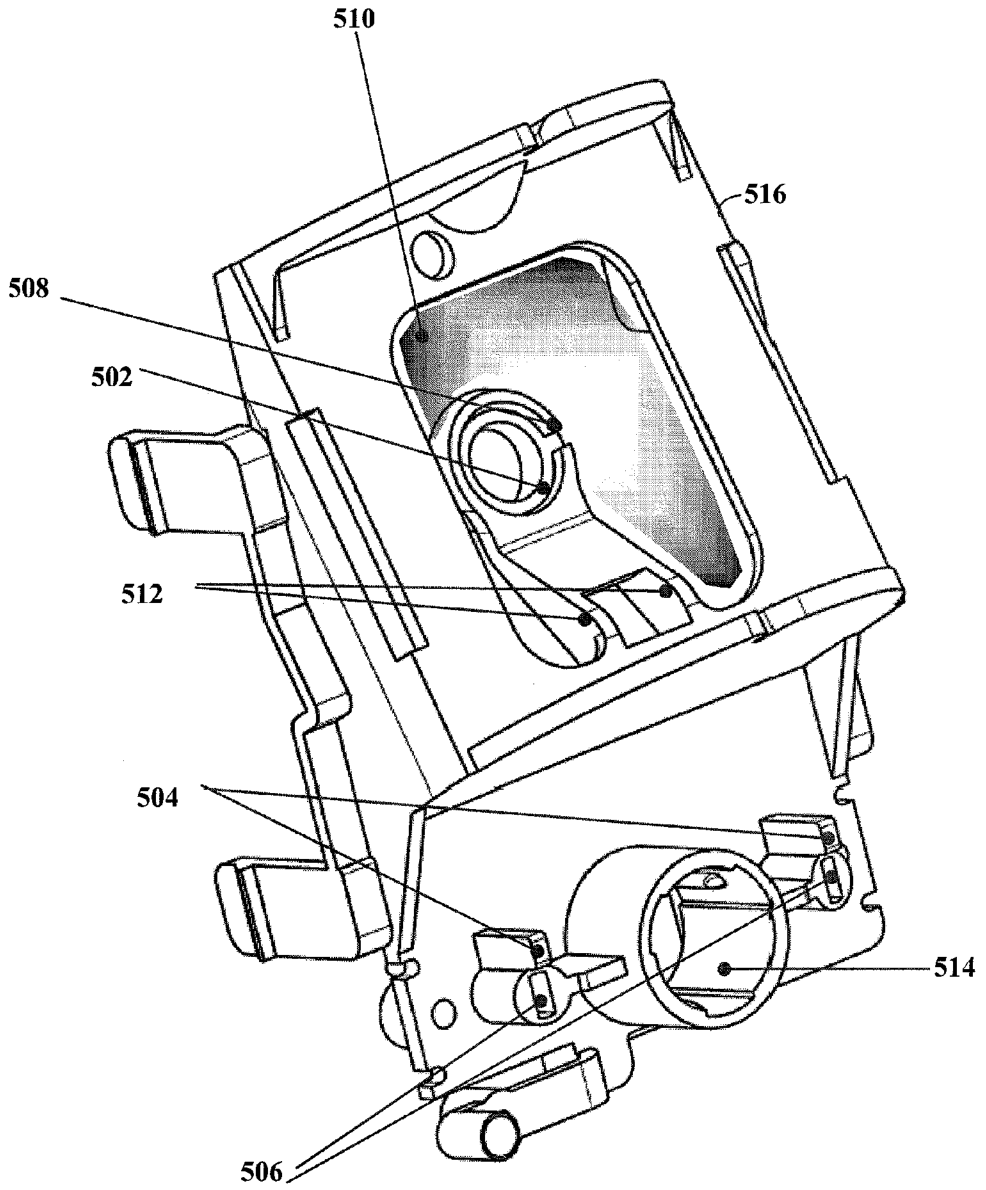
FIG. 5 is a perspective view of an internal support piece of a motion-image security device, according to an example embodiment of the present invention.

FIGS. 4A-4B and FIG. 5 illustrate various views of one embodiment of the monitoring device shown in FIG. 3. FIG. 4A illustrates IR-type LEDs (infrared emitting diodes or IREDs) 410 and 412 that emit light as used by the monitoring device for night-vision image capture. FIG. 4B is a bottom view of such a device that orients the LEDs 410 and 412 for motion-image security purposes. A sensor, such as image-capture 314 and PIR detector 312 captures the reflected IR. FIG. 4A shows two possible illumination patterns 420 and 430 for IREDs 410 and 412. 420 shows a first illumination pattern where the bases of the IREDs are parallel to each other. Such a pattern would result from standard mounting on a common PCB. 430 shows a second illumination pattern that has less overlap of illumination and provides a broader illumination angle. This is accomplished by angling the IREDs away from one another. Such an angled illumination pattern can be accomplished using techniques similar to those discussed in relation to PIR sensor 312 and as further discussed herein.

FIG. 5 is a perspective view of an internal support piece of a motion-image security device, according to an example embodiment of the present invention.

The PIR sensor support of FIG. 5 is connected with the body of the main plastic (structural) part 516 using strippable ribs 512. These ribs 512 may be cut to gain access to the circuit board 310, for example, to make repairs, without interfering with the PIR sensor 312. The ribs 512 allow for access to the circuitry without need to unsolder the PIR sensor or potentially disturb the PIR sensor's angle as depicted at 316 of FIG. 3. The image-capture device may be of surface-mounted device (SMD) type and soldered using a reflow process. The circuit board (310 of FIG. 3) is attached, e.g., clipped, to the main plastic part 516 and the board-support combination is inserted into the housing 302 of the motion-image security device with each of the sensing components angled so as to provide a common field of view. The housing 302 is generally shown in FIG. 3, and for a more particular view of such a housing, reference may be made to U.S. Design Application No. 29/256,856, filed on Mar. 24, 2006, entitled "Mountable Security Detector."

In one embodiment of the present invention, parasitic reflection of light can be reduced using a thin wall 510. In a preferred embodiment, this wall 510 has a cone shape that minimizes adverse effects to the view pattern of the PIR sensor.

Consistent with another embodiment of the present invention, keying of the various sensors and illumination devices can be incorporated into housing 302. More specifically, IRED supports 506 can include keying portions 504 and PIR support 502 can include keying portion 508. Various keying solutions can be implemented depending upon the component being used and the housing design.

Certain embodiments include a compact housing which involves miniaturization of the circuitry and components of the motion-image security device. To obtain a compact overall device, the electronic components are assembled on both sides of the circuit board. In certain implementations, the placement includes the image sensor located on a top side with the video processor located on the opposite side. Thus the length of the connections between the image sensor and the processor can be reduced so as to avoid signal noise. Moreover, to reduce electromagnetic interference (EMI), the "noisy" components (e.g., video components, image sensor, video processor, memory) are located near one portion of the board such as the bottom, while the RF and the PIR conditioning circuits are located near another portion such as the upper end.

The image sensor is used in connection with two infrared emitting diodes (IREDs) to provide night vision and image-capture in light-deficient environments. In certain implementations, they are located near the image sensor, in a symmetrical fashion, to evenly distribute the infrared energy. In certain other implementations the IREDs are not positioned horizontally but instead have angled bases or supports to provide an infrared distribution that reduces the overlap between the two IREDs in the central axis and increases the angle of illumination. The IREDs also draw a high level of current, which limits the use of small SMD types, which cannot dissipate high power. Instead, the through hole-type is used. This is also advantageous for allowing flexibility in the angles of illumination provided by the IREDs.

Common through-hole footprints create difficulties in placing the video processor near (but on an opposite side of) the image sensor. In certain implementations, a plastic support piece is used to overcome these difficulties. For example, the IREDs are positioned by adapting IRED supports on the plastic support to orient the desired angles of the IREDs, and thereby avoiding the soldering of the thru hole IRED during the initial placement. The IRED (through-hole) legs can be bent and using a screw 404 to create pressure on the legs of each of the IREDs thereby forming an electrical contact with the circuit board. In one implementation, these two screws also serve to fastening the image sensor lens holder 514 tightly to the circuit board to reduce parasitic light due to gaps between the circuit board and the lens holder.

The above-discussed screws can be used for both tightening the support holder to the circuit board, to position the optical chamber between the image sensor and the lens, and for pressing the IRED legs to the circuit board to obtain a good contact. Soldering is then optionally avoided for the IRED attachment and the metalized holes usually required for a through hole footprint are also not needed. This frees space on the opposite side of the circuit board for positioning the video processor (e.g., a DSP).

According to another embodiment of the present invention, the various components can be integrated independently from a single, non-adjustable circuit board. For instance, a flex board can be used to provide different angles for the IREDs, camera and motion detector. Another such implementation may incorporate flexible/angled interconnects, such as ribbon cable or angled connecters, to integrate the components and circuit board(s) upon which the components reside. These and other embodiments include the use of a power control circuit that is used in conjunction with a battery circuit. The power control circuit responds to various control signals by reducing the power consumption of the device. This is particularly useful for implementing a self-powered device that operates for extended periods of time without replacing, recharging or otherwise supplementing power to the device.

In one instance, the power control circuit receives control signals from the central controller. In response to the control signals, the power control circuit can implement any one of a number of different power-saving techniques. One such technique involves placing the device in reduced power state by disabling or otherwise reducing power consumption by one or more of the motion detector, camera and IREDs. Thus, the power control circuit can maintain the reduced power state until a control signal is received that prompts the device to leave the reduced power state. Such a control signal can be from the central controller or from other sources, such as a key fob or an intrusion sensor. Additional logic can further control the various power states. For instance, the motion detector can be activated in response to a control signal, while keeping the camera disabled until motion is detected. This can also reduce the intrusiveness of the security system by minimizing the time during which images are captured. In another power reduction state, the image captures can be reduced in frequency. For example, instead of capturing an image every second, the device could be configured to capture and/or transmit an image every minute. This can significantly reduce the average power consumption over a period of time.

In another instance, the power control circuit controls the transmission of images from the camera to the central controller. Wireless transmission circuitry can require a significant amount of power to operate. Thus, the transmission of large amounts of data may require extensive periods of transmission activity and corresponding power draw. One technique employed by the device is performed by compression logic that reduces the size of the image data to be transferred. Another technique involves logic to limit the transmitted data to necessary images. For instance, the device may be enabled to capture images when a door or window sensor is triggered; however, the captured images need not be sent if a correct authorization code is provided by the person triggering the sensor. Various other logic implementations can be used to reduce unnecessary transmissions of captured images. Yet another technique involves the use of efficient handshake protocols between the devices. Many communication protocols require one or more of the devices to have extended periods of listening or sending in order to synchronize communications between devices. An efficient handshaking protocol can be used to reduce the synchronization times leading to significant power savings. For further details of one such protocol, reference can be made to U.S. application Ser. No. 11/389,673 filed on Mar. 24, 2006, entitled "Spread Spectrum Communications for Building-Security"(U.S. Pat. No. 7,835,343), which is fully incorporated herein by reference.

Figure 6:
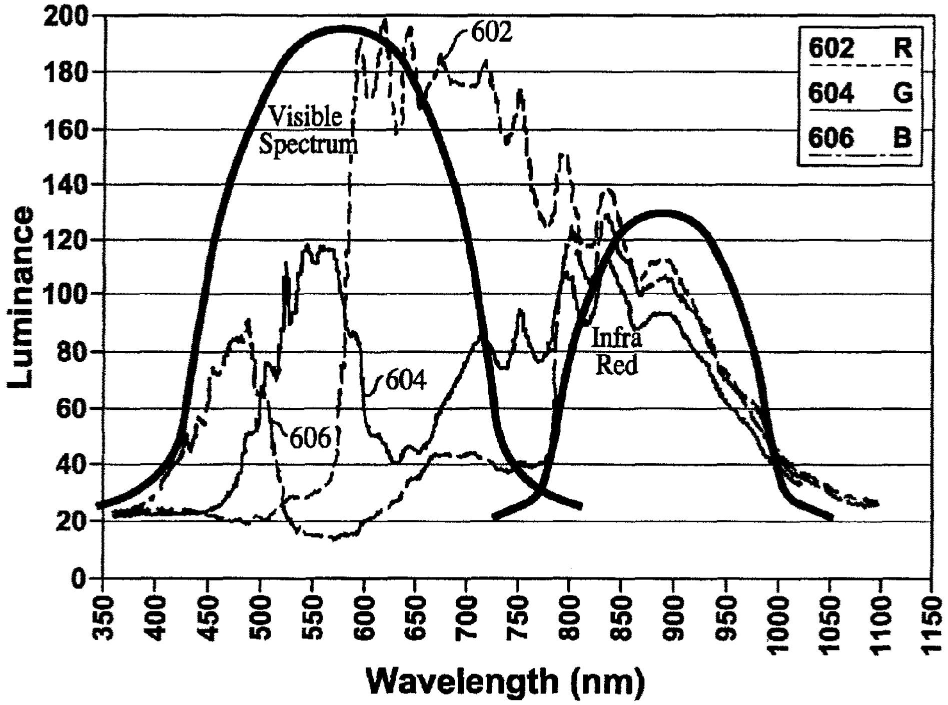
FIG. 6 is a graph of filter responses, according to an example embodiment of the present invention.

In other embodiments, the motion-image security device may be used to capture images both in daylight and using night vision technology. In environments with sufficient light, the image sensor may capture images in color. In addition, the image-capture device includes a camera that can also obtain black and white pictures in low-light environments such as at night using an infrared illuminator. This can be achieved with a black and white image sensor since color image sensors integrate a filter, which rejects the IR wavelength in order to keep the color fidelity. In certain implementations, a color image sensor is used with specific color filters. FIG. 6 shows a graph of filter responses (illustrated by lines representing green 604, red 602 and blue 606 colors), according to an example embodiment of the present invention. The illustrated filters' responses show that in the IR wavelength, the sensitivity of each color is balanced, and is close to the sensitivity in the visible spectrum. This allows night vision with the IRED illuminators where the color signal is ignored, and only the luminescence signal is used to obtain black and white pictures.

Another embodiment allows for multiple image-capture possibilities in daylight environments. If the level of IR light is low (e.g., indoor light with fluorescent bulbs), the color fidelity will be good because the response to each color will not be overly effected by IR light and the camera can capture color images. If the level of IR is high (e.g., incandescent bulbs or direct sun exposure), the color fidelity of the image sensor may be adversely effected by the IR light, and the camera can deliver black and white images. In still other embodiments, all image acquisition operates using the color signals while a remote monitoring station (e.g., PC) determines if the black and white or color images will be displayed.

In certain implementations, the image-capture device is initialized with multiple operating modes. For example, in an auto mode, once the image-capture device is armed, the device will begin video image acquisition as soon as the motion detector detects motion. In another example, in a control panel mode the motion-image security device sends an intrusion notification to the control panel and waits for a video acquisition command from the panel. The video acquisition and video transfer to the control panel are two independent actions. This allows the image-capture device to obtain video images within a delayed zone, before the system is disarmed. If the disarming is done before the end of a delay, the video will be erased; otherwise the control panel will request the video data and send the video data to a remote monitoring station.

In certain instances, a video transfer requires several times more power than video acquisition. The image-capture device is able to transfer video data at a request of the control panel through a radio channel. The control panel can also request video erasing in memory. Since video data transfer can take more than two minutes, during the transfer time, a destruction of the image-capture device will result in the loss of the remaining video stored in RAM memory. A non volatile memory (e.g., Flash type) may be used to duplicate the video data immediately after the acquisition or during it. The small size of the Flash chip (e.g., SO8) makes it difficult to break, and thus, increases the likelihood of the video data being recovered in case of the device being damaged by an intruder.

The various circuits and logic describe herein can be implemented using a variety of devices including, but not limited to, discrete logic components, analog components, general purpose processors configured to execute software instructions, programmable logic devices and combinations thereof. While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. For use in a security system that uses a controller to communicate with security-monitoring devices, an integrated image-capture device comprising:

a circuit board structure having an angle-setting support article, a circuit board with a nonadjustable surface, and electrical conductors;

an integrated arrangement including a camera secured to the nonadjustable surface and directed at a first angle relative to the nonadjustable surface, and a motion detector secured to the nonadjustable surface and differently directed at a second angle relative to the nonadjustable surface of the circuit board, the support article setting the first angle relative to the second angle for capturing both images and motion in a target area, and the camera and the motion detector electrically connected to respective ones of the electrical conductors;

a control circuit for wireless communication between the controller and the integrated arrangement;

a rechargeable power supply;

a solar circuit for converting optical energy into electrical energy; and a charge circuit configured to receive electrical energy from the solar circuit and to use the received electrical energy to charge the rechargeable power supply.

2. The device of claim 1, further including a control circuit for testing one of the camera and motion detector to determine whether weather conditions have obstructed light from reaching the camera or the motion detector.

3. The device of claim 1, wherein the device includes a housing that secures the circuit board and an independent power source, and that is adapted to direct the motion detector at an angle along a substantially horizontal plane and to direct the camera in a downwardly direction to cover an area beneath the substantially horizontal plane.

4. The device of claim 1, further comprising:

two infrared emitters integrated with the surface of the circuit board using one or more wired connections; and two supports that direct one of the infrared emitters at an angle different from an angle of the other infrared emitter.

5. The device of claim 4, wherein the infrared emitters are directed away from one another, thereby increasing an angle of illumination from both emitters, relative to an angle of illumination for both emitters directed parallel to each other and wherein the infrared emitters are electrically connected to the circuit board using a screw that also physically connects a video processor to the circuit board.

6. The device of claim 4, wherein the infrared emitters are directed away from one another, thereby increasing an angle of illumination from both emitters, relative to an angle of illumination for both emitters directed parallel to each other and wherein the infrared emitters are connected to the circuit board using a screw.

7. The device of claim 1, wherein the support that directs the motion detector includes strippable ribs for removal of the support.

8. The device of claim 1, wherein the circuit board includes an image processor and wherein the image processor and at least part of a communication circuit are located on a side of the circuit board opposite a side of the circuit board from which the motion detector and the image capture device are directed.

9. The device of claim 1, wherein the device includes a water-tight housing that holds the circuit board and that includes a cone shaped portion to reduce parasitic light from reaching the motion detector.

10. The device of claim 1, wherein the motion detector is a passive infrared detector.

11. The device of claim 1, wherein the device is arranged to capture pictures in a black-and-white mode and a color mode.

12. The device of claim 9, wherein during low light conditions, the device operates in the black-and-white mode using light provided by infrared emitters located on the circuit board and wherein, during high light conditions, the device is selectable to operate in either the black-and-white mode or the color mode.

13. The device of claim 1, further including a water-tight casing that contains the circuit board structure.

14. For use in a security system that uses a controller to communicate with security-monitoring devices, an image-capture device having a circuit board with a nonadjustable surface, the device comprising:

a wireless circuit for wirelessly interfacing with the controller;

a camera secured to the nonadjustable surface of the circuit board and directed at a first angle substantially perpendicular to the surface of the circuit board;

a motion detector integrated with the nonadjustable surface of the circuit board using one or more through-hole connections;

a support that directs the motion detector at a second angle different from said first angle during soldering of the through-hole connections;

a solar circuit for converting optical energy into electrical energy; and a power circuit for using the electrical energy from the solar circuit to power the device.

15. For use in a security system that uses a controller to communicate with security-monitoring devices, an integrated image-capture device comprising:

a battery circuit;

a circuit for receiving wireless control signals;

a power-control circuit, responsive to reception of the wireless control signals, to control use of the battery circuit;

a camera;

a motion detector;

a circuit board structure to electrically integrate the camera and the motion detector, to set a first angle at which the camera is to capture images and to set a second angle, different from the first angle, at which the motion detector is to detect motion;

logic for synchronizing transmission of data between the circuit for receiving wireless control signals and the controller;

a solar circuit for converting optical energy into electrical energy; and a power circuit for using the electrical energy from the solar circuit to power the device.

16. The device of claim 15, wherein the device operates in a first power mode and a second power mode under the control of the power-control circuit and wherein the first power mode reduces power consumption of one or more of the camera, the motion detector and the circuit for receiving wireless control signals with respect to power consumption of said one or more of the camera, the motion detector and the circuit for receiving wireless control signals operating in the second power mode.

17. The device of claim 15, further including logic to compress image data captured by the camera.

18. The device of claim 15, further including a temporary memory for storing captured images and logic to select a portion of the stored captured images to be transmitted to the controller and a second portion of the stored captured images that is not transmitted to the controller.

19. The device of claim 15, wherein the synchronization logic identifies periodic times during which communication occurs between the image-capture device and the controller and wherein the power-control circuit disables the circuit for receiving wireless control signals during time not identified as the periodic times.

* * * * *